United States Patent
Aggarwal et al.

(10) Patent No.: US 12,328,395 B2
(45) Date of Patent: Jun. 10, 2025

(54) NETWORK SECURITY

(71) Applicant: Nokia Technologies Oy, Espoo (FI)

(72) Inventors: Chaitanya Aggarwal, Munich (DE); Anja Jerichow, Grafing bei München (DE); Saurabh Khare, Bangalore (IN); Georgios Gkellas, Petroupoli Attica (GR)

(73) Assignee: NOKIA TECHNOLOGIES OY, Espoo (FI)

( * ) Notice: Subject to any disclaimer, the term of this patent is extended or adjusted under 35 U.S.C. 154(b) by 242 days.

(21) Appl. No.: 18/047,434

(22) Filed: Oct. 18, 2022

(65) Prior Publication Data

US 2023/0155832 A1    May 18, 2023

(30) Foreign Application Priority Data

Nov. 12, 2021 (IN) .............................. 202141051971

(51) Int. Cl.
*H04L 9/32* (2006.01)
*H04L 9/40* (2022.01)

(52) U.S. Cl.
CPC ........ *H04L 9/3213* (2013.01); *H04L 63/0884* (2013.01)

(58) Field of Classification Search
None
See application file for complete search history.

(56) References Cited

U.S. PATENT DOCUMENTS

| | | |
|---|---|---|
| 2021/0250172 A1 | 8/2021 | Choyi et al. |
| 2022/0052989 A1* | 2/2022 | Zhao ...................... H04L 63/08 |

(Continued)

FOREIGN PATENT DOCUMENTS

| | | |
|---|---|---|
| WO | 2021/150153 A1 | 7/2021 |

OTHER PUBLICATIONS

Claeys et al. Securing Complex IoT Platforms with Token Based Access Control and Authenticated Key Establishment. 2017 International Workshop on Secure Internet of Things. IEEE. 9 pages (Year: 2017).*

"3rd Generation Partnership Project; Technical Specification Group Services and System Aspects; Study on enhanced security aspects of the 5G Service Based Architecture (SBA); (Release 17)", 3GPP TR 33.875, V0.4.0, Aug. 2021, pp. 1-44.

(Continued)

*Primary Examiner* — Jeffrey R Swearingen
(74) *Attorney, Agent, or Firm* — SQUIRE PATTON BOGGS (US) LLP

(57) ABSTRACT

According to an example aspect of the present invention, there is provided an apparatus configured to process a request for an access token authorizing access for a network function consumer to a service provided by a network function producer, the request being received in the apparatus from a service communication proxy, wherein the processing comprises one or more of the following verification: verification that a credential data element comprised in the request, cryptographically signed by the network function consumer, identifies the request, the service or a type of the service, and verification with reference to a further node, or to a profile of the network function consumer, that the service communication proxy is authorized to act on behalf of the network function consumer, and transmit, responsive to at least one of the verifications being successful, the requested access token, the access token comprising an indication of the service communication proxy.

8 Claims, 5 Drawing Sheets

(56) References Cited

U.S. PATENT DOCUMENTS

2022/0104162 A1    3/2022  Aggarwal et al.
2022/0131911 A1*  4/2022  Das .................... H04L 65/1016

OTHER PUBLICATIONS

"3rd Generation Partnership Project; Technical Specification Group Services and System Aspects; Security architecture and procedures for 5G system (Release 17)", 3GPP TS 33.501, V17.3.0, Sep. 2021, pp. 1-258.

"3rd Generation Partnership Project; Technical Specification Group Services and System Aspects; System architecture for the 5G System (5GS); Stage 2 (Release 17)", 3GPP TS 23.501, V17.2.0, Sep. 2021, pp. 1-542.

"3rd Generation Partnership Project; Technical Specification Group Core Network and Terminals; 5G System; Principles and Guidelines for Services Definition; Stage 3 (Release 17)", 3GPP TS 29.501, V17.3.1, Sep. 2021, pp. 1-78.

Hardt, "The OAuth 2.0 Authorization Framework", RFC 6749, Internet Engineering Task Force (IETF), Oct. 2012, pp. 1-76.

Extended European Search Report received for corresponding European Patent Application No. 22201765.9, dated Mar. 15, 2023, 12 pages.

Communication pursuant to Article 94(3) EPC dated Dec. 20, 2024 corresponding to European Patent Application No. 22201765.9.

* cited by examiner

510 — Processing, in an apparatus, a request for an access token authorizing access for a network function consumer, NFc, to a service provided by a network function provider, NFp, the request being received in the apparatus from a service communication proxy, wherein the processing comprises one or more of the following verification:

520 — verification that a credential data element comprised in the request, cryptographically signed by the NFc, identifies the request, the service or a type of the service 525 — verification with reference to a further node, or to a profile of the NFc, that the service communication proxy is authorized to act on behalf of the NFc 530 — transmitting, responsive to at least one of the verifications being successful, the requested access token, the access token comprising an indication of the service communication proxy

FIGURE 5

NETWORK SECURITY

FIELD

The present disclosure relates to the field of network management and secure provision of services in networks.

BACKGROUND

In networks supporting wireless or wire-based communication, discovering network functions, NFs, and network function services is of interest as many network function instances may be virtualized and be of a dynamic nature. Core network, CN, entities may seek to discover a set of one or more NF instances and NF service instances for a specific NF service or an NF type. Examples of such CN entities include NFs and service communication proxies, SCPs. Examples of NF instances to be discovered include application functions, gateways and subscriber data repositories, and also application related functions, for example for vertical industry support, or entertainment. Further examples include a resource control or management function, a session management or control function, an interworking, data management or storage function, an authentication function or a combination of one or more of these functions. NF service instances, known also as NF services, include individual services provided by an NF. One NF may be configured to provide more than one service, wherein each of the more than one service may be reachable using a different approach, such as a different address or port or communication protocol.

NF service discovery may be enabled via a NF discovery procedure, as specified for wireless communication networks in technical specifications established by the third generation partnership project, 3GPP, or GSMA, GSM association, for example. However, technology disclosed herein has relevance also to wire-line communication networks.

SUMMARY

According to some aspects, there is provided the subject-matter of the independent claims. Some embodiments are defined in the dependent claims. The scope of protection sought for various embodiments of the invention is set out by the independent claims. The embodiments, examples and features, if any, described in this specification that do not fall under the scope of the independent claims are to be interpreted as examples useful for understanding various embodiments of the invention.

According to a first aspect of the present disclosure, there is provided an apparatus comprising at least one processing core, at least one memory including computer program code, the at least one memory and the computer program code being configured to, with the at least one processing core, cause the apparatus at least to process a request for an access token authorizing access for a network function consumer to a service provided by a network function producer, the request being received in the apparatus from a service communication proxy, wherein the processing comprises one or more of the following verification: verification that a credential data element comprised in the request, cryptographically signed by the network function consumer, identifies the request, the service or a type of the service, and verification with reference to a further node, or to a profile of the network function consumer, that the service communication proxy is authorized to act on behalf of the network function consumer, and transmit, responsive to at least one of the verifications being successful, the requested access token, the access token comprising an indication of the service communication proxy.

According to a second aspect of the present disclosure, there is provided an apparatus comprising at least one processing core, at least one memory including computer program code, the at least one memory and the computer program code being configured to, with the at least one processing core, cause the apparatus at least to process a request for access for a network function consumer to a service provided by a network function producer, the request being received in the apparatus from a service communication proxy, wherein the processing comprises one or more of the following verification: verification that a credential data element comprised in the request, cryptographically signed by the network function consumer, identifies the request, the service or a type of the service, and verification that an access token comprised in the request indicates that the service communication proxy is authorized to act on behalf of the network function consumer, and provide, responsive to at least one of the verifications being successful, the network function consumer with access to the service.

According to a third aspect of the present disclosure, there is provided an apparatus comprising at least one processing core, at least one memory including computer program code, the at least one memory and the computer program code being configured to, with the at least one processing core, cause the apparatus at least to function as a network function consumer, and transmit, to a service communication proxy, a request for a service provided by a network function producer, the request comprising a credential data element, cryptographically signed by the apparatus, which identifies the request and/or the service of the network function producer.

According to a fourth aspect of the present disclosure, there is provided a method comprising processing, in an apparatus, a request for an access token authorizing access for a network function consumer to a service provided by a network function producer, the request being received in the apparatus from a service communication proxy, wherein the processing comprises one or more of the following verification: verification that a credential data element comprised in the request, cryptographically signed by the network function consumer, identifies the request, the service or a type of the service, and verification with reference to a further node, or to a profile of the network function consumer, that the service communication proxy is authorized to act on behalf of the network function consumer, and transmitting, responsive to at least one of the verifications being successful, the requested access token, the access token comprising an indication of the service communication proxy.

According to a fifth aspect of the present disclosure, there is provided a method comprising processing, in an apparatus, a request for access for a network function consumer to a service provided by a network function producer, the request being received in the apparatus from a service communication proxy, wherein the processing comprises one or more of the following verification: verification that a credential data element comprised in the request, cryptographically signed by the network function consumer, identifies the request, the service or a type of the service, and verification that an access token comprised in the request indicates that the service communication proxy is authorized to act on behalf of the network function consumer, and providing, responsive to at least one of the verifications being successful, the network function consumer with access to the service.

According to a sixth aspect of the present disclosure, there is provided a method comprising functioning, by an apparatus, as a network function consumer, and transmitting, to a service communication proxy, a request for a service provided by a network function producer, the request comprising a credential data element, cryptographically signed by the apparatus, which identifies the request, and/or the service of the network function producer.

According to a seventh aspect of the present disclosure, there is provided an apparatus comprising means for processing a request for an access token authorizing access for a network function consumer to a service provided by a network function producer, the request being received in the apparatus from a service communication proxy, wherein the processing comprises one or more of the following verification: verification that a credential data element comprised in the request, cryptographically signed by the network function consumer, identifies the request, the service or a type of the service, and verification with reference to a further node, or to a profile of the network function consumer, that the service communication proxy is authorized to act on behalf of the network function consumer, and transmitting, responsive to at least one of the verifications being successful, the requested access token, the access token comprising an indication of the service communication proxy.

According to an eighth aspect of the present disclosure, there is provided an apparatus comprising means for processing a request for access for a network function consumer to a service provided by a network function producer, the request being received in the apparatus from a service communication proxy, wherein the processing comprises one or more of the following verification: verification that a credential data element comprised in the request, cryptographically signed by the network function consumer, identifies the request, the service or a type of the service, and verification that an access token comprised in the request indicates that the service communication proxy is authorized to act on behalf of the network function consumer, and providing, responsive to at least one of the verifications being successful, the network function consumer with access to the service.

According to a ninth aspect of the present disclosure, there is provided an apparatus comprising means for functioning, as a network function consumer, and transmitting, to a service communication proxy, a request for a service provided by a network function producer, the request comprising a credential data element, cryptographically signed by the apparatus, which identifies the request, and/or the service of the network function producer.

According to a tenth aspect of the present disclosure, there is provided a non-transitory computer readable medium having stored thereon a set of computer readable instructions that, when executed by at least one processor, cause an apparatus to at least process a request for an access token authorizing access for a network function consumer to a service provided by a network function producer, the request being received in the apparatus from a service communication proxy, wherein the processing comprises one or more of the following verification: verification that a credential data element comprised in the request, cryptographically signed by the network function consumer, identifies the request, the service or a type of the service, and verification with reference to a further node, or to a profile of the network function consumer, that the service communication proxy is authorized to act on behalf of the network function consumer, and transmit, responsive to at least one of the verifications being successful, the requested access token, the access token comprising an indication of the service communication proxy.

According to an eleventh aspect of the present disclosure, there is provided a non-transitory computer readable medium having stored thereon a set of computer readable instructions that, when executed by at least one processor, cause an apparatus to at least process a request for access for a network function consumer to a service provided by a network function producer, the request being received in the apparatus from a service communication proxy, wherein the processing comprises one or more of the following verification: verification that a credential data element comprised in the request, cryptographically signed by the network function consumer, identifies the request, the service or a type of the service, and verification that an access token comprised in the request indicates that the service communication proxy is authorized to act on behalf of the network function consumer, and provide, responsive to at least one of the verifications being successful, the network function consumer with access to the service.

According to a twelfth aspect of the present disclosure, there is provided a non-transitory computer readable medium having stored thereon a set of computer readable instructions that, when executed by at least one processor, cause an apparatus to at least function as a network function consumer, and transmit, to a service communication proxy, a request for a service provided by a network function producer, the request comprising a credential data element, cryptographically signed by the apparatus, which identifies the request, and/or the service of the network function producer.

BRIEF DESCRIPTION OF THE DRAWINGS

FIG. 5 is a flow graph of a method in accordance with at least some embodiments of the present invention.

EMBODIMENTS

In a service-based architecture, SBA, where access tokens are used to authorize access for network function consumers to services provided by network function producers, the access tokens may be furnished with an indication as to a proxy, such as a service communication proxy, SCP, authorized to act on behalf of a specific network function consumer, NFc. A network repository function, NRF, may obtain from a profile of the NFc, or from a further node, such as an OEM node, information enabling identifying whether a specific SCP is authorized for the specific NFc. Further, a credential data element, such as a client credential assertion, CCA, of the NFc may include an indication of a request, a service or a service type for which the credential data element is valid. These features provide the effect that an attack surface is decreased, as re-using credential data elements and/or access tokens for malicious purposes is made substantially more difficult. Thus confidence in the service-based architecture is enhanced, and the architecture may be used in a broader range of digital services.

Figure 1:
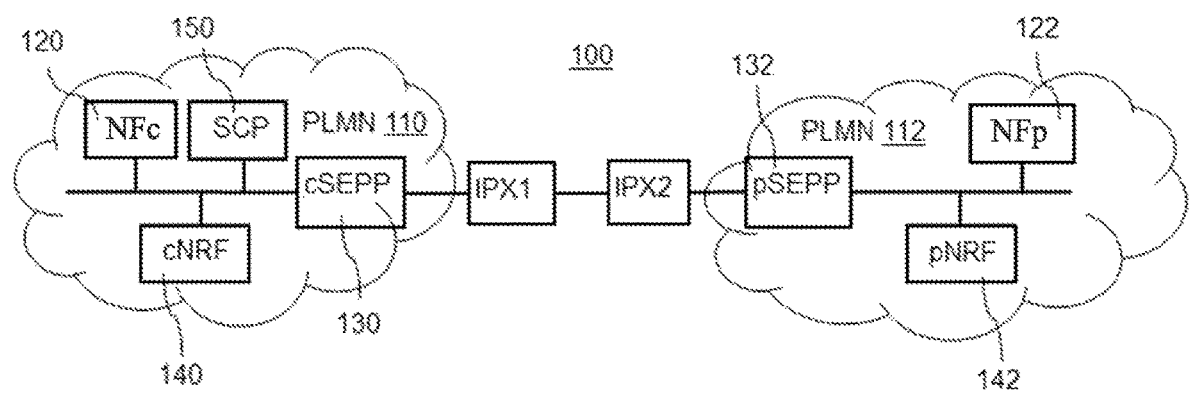
FIG. 1 illustrates an example system in accordance with at least some embodiments of the present invention.

FIG. 1 illustrates an example system 100 in accordance with at least some embodiments of the present invention. The system comprises two public land mobile networks, PLMNs, 110, 112, each equipped with a network function, NF, 120, 122. A network function may refer to an operational and/or a physical entity. A network function may be a specific network node or element, or a specific function or set of functions carried out by one or more entities, such as virtualized network elements, VNFs. One physical node may be configured to perform plural NFs. Examples of such network functions include a resource control or management function, session management or control function, interworking, data management or storage function, authentication function or a combination of one or more of these functions.

In case of a third generation partnership project, 3GPP, fifth generation, 5G, system service based architecture, SBA, core network, NFs may comprise at least some of an access and mobility management function, AMF, a session management function, SMF, a network slice selection function, NSSF, a network exposure function, NEF, a network repository function, NRF, a unified data management, UDM, an authentication server function, AUSF, a policy control function, PCF, and an application function, AF. A NEF is configured to provide access to exposed network services and capabilities. A UDM is configured to manage network user data in a single, centralized element. The PLMNs each may further comprise a security edge protection proxy, SEPP, 130, 132 configured to operate as a security edge node or gateway. The NFs may communicate with each other using representational state transfer, REST, application programming interfaces, APIs, for example. These may be known as RESTful APIs. Further examples of NFs include NFs related to gaming, streaming or industrial process control. The system may comprise also nodes from 3G or 4G node systems, such as home subscriber server, HSS, and a suitable interworking function for protocol translations between e.g. Diameter and JSON-based RESTful APIs. While described herein primarily using terminology of 5G systems, the principles of the invention are applicable also to other communication networks using proxies as described herein, such as 4G networks and non-3GPP networks, as well as wire-line communication networks, for example.

While the example of FIG. 1 has two PLMNs 110, 112, in general at least some embodiments of the invention may be practiced in a single PLMN, which need not necessarily have SEPPs. In a two-PLMN case, in FIG. 1, the SEPP 130, 132 is a network node at the boundary of an operator's network that may be configured to receive a message, such as an HTTP request or HTTP response from an NF, to apply protection for sending and to forward the reformatted message through a chain of intermediate nodes, such as IP eXchanges, IPX, towards a receiving SEPP. The receiving SEPP receives a message sent by the sending SEPP and forwards the message towards an NF within its operator's network, e.g. the AUSF.

In the example of FIG. 1, communication takes place between a service-consuming NF and a service-producing NF, henceforth referred to as NFc 120 and NFp 122, respectively. They may also be referred to as NF service consumer and NF service producer, or more briefly network function consumer and network function producer, respectively. As noted, the NFc and NFp may reside in the same PLMN or in different PLMNs. Depending on the situation, the same function may perform the role of a NFc or the NFp.

A service communication proxy, SCP, 150 may be deployed for indirect communication between network functions, NFs. An SCP is an intermediate network entity to assist in indirect communication between an NFc and an NFp, including routing messages, such as, for example, control plane messages between the NFs, and optionally including discovering and selecting NFp 122 on behalf of NFc 120, or requesting an access token from the NRF 140, 142 or an Authorization Server on behalf of NFc 120 to access the service of NFp 122, receiving the response from NFp 122 and forwarding it to NFc 120. An SCP is an example of a proxy entity.

Direct communication may be applied between NFc 120 and NFp 122 for an NF service, or NF service communication may be performed indirectly via proxy entities, such as SCP(s) 150. In direct communication, the NFc 120 performs discovery of the target NFp 122 by local configuration or via NRF 140, 142. In indirect communication, the NFc 120 may delegate the discovery of the target NFp 122 to the SCP 150. In the latter case, the SCP may use the parameters provided by NFc 120 to perform discovery and/or selection of the target NFp 122, for example with reference to one or more NRF. In detail, two variants of indirect communication may be defined:

Firstly, "Model C" where the NFc communicates directly with an NRF to discover a suitable NFp and request, and receive, an access token for the service it wants, directly from the NRF without using an SCP. In this model, the NFc may then request the service itself, with the access token, via an SCP. It is the SCP, or a further SCP, in Model C which then communicates with the NFp to practically request the service, using the access token which is provided by the NFc to the SCP.

Secondly, "Model D" may be defined where the NFp delegates also the discovery and access token requesting to the SCP. In this model, the SCP communicates with both the NRF and the NFp, and the NFc need only communicate with an SCP.

NF discovery and NF service discovery enable entities, such as NFc or SCP, to discover a set of NF instance(s) and NF service instance(s) for a specific NF service or an NFp type. The NFc and/or the SCP may be core network entities. The network repository function, NRF, may comprise a function that is used to support the functionality of NF and NF service registration, discovery, authorization and status notification. Additionally, or alternatively, the NRF may be configured to act as an authorization server. The NRF may maintain an NF profile of available NFp entities and their supported services. The NRF may notify about newly registered, updated, or deregistered NFp entities along with its NF services to a subscribed NFc or SCP. An NRF may thus notify NFc entities or SCP(s) concerning where, that is, from which NFp entities, they may obtain services they need. An NRF may be co-located together with an SCP, for example, run in a same physical computing substrate. Alternatively, NRF may be in a physically distinct node than an SCP.

When registering a service in an NRF, the NFp offering the service may impose one or more limitations on which NFc nodes may access the service. These limitations may be defined in terms of FQDN, domain and/or SNPN, for example. Likewise when registering, the NFp may cause the NRF to keep a profile of itself where the NFp may also include information relating to the NFp when it acts in the role of NFc.

In order for the NFc 120 or SCP 150 to obtain information about NFp 122 and/or NF service(s) registered or configured in a PLMN/slice, NFc 120 or SCP 150 may initiate, for example based on local configuration, a discovery procedure with an NRF, such as cNRF 140. The discovery procedure may be initiated by providing the type of the NFp and optionally a list of the specific service(s) the NFc or SCP is attempting to discover. The NFc 120 or SCP 150 may additionally or alternatively provide other service parameters, such as information relating to network slicing.

It is to be noted that at least some of the entities or nodes 120, 122, 140, 142 may act in both service-consuming and service-providing roles and that their physical structure may be similar or identical, while their role in the present examples in delivery of a particular message or service is identified by use of the prefix/suffix "c" or "p" indicating whether they are acting as the service-consuming or service-producing NF. It is to be noted that instead of "c" and "p", "v" for visited and "h" for home can be used to refer to at least some respective entities in the visited and home PLMNs. In some embodiments, a system implementing an embodiment of the present disclosure comprises both fourth generation, 4G, and fifth generation, 5G, parts.

In some embodiments OAuth based service authorization and/or access token exchange is applied between NFc and NFp for the purpose of authorizing an NFc to access the service of an NFp. Alternatively to OAuth, another authorization framework may be applied. Thus, a network entity, such as an NRF, may be or perform as an authorization server, AS, such as an OAuth authorization server, for example. The NFc may be an OAuth client and the NFp may operate as OAuth resource server, and they may be configured to support OAuth authorization framework as defined in RFC 6749, for example. An NFc, or an SCP acting on behalf of the NFc, may send two separate requests to an NRF, firstly a discovery request to which the NRF responds by offering concerning suitable NFp entities, and secondly an access token request concerning one of the suitable NFp entities. The NRF may respond to the access token request by providing the requested access token if it decides to grant access, and by a refusal in case the NRF decides to not grant access.

In general, a network support function such as an NRF may further be configured to act as an authorization server, and provide the NFc, or an SCP acting on behalf of the NFc, with a cryptographic access token authorizing the NFc to use the service provided by the NFp. In general, an NRF is a terminological example of a network support node. In general, an SCP is a terminological example of a proxy entity. The NFc and/or SCP may include the access token in a request message when requesting the service from the NFp, for example in an "authorization bearer" header. Such an access token may be referred to herein briefly as a token. For example, the NRF may act as an OAuth 2.0 authentication server. An access token may comprise, for example, one, more than one or all of the following fields:

Access Token
    Iss: NF Instance ID of NRF issuing the token
    Sub: NF Instance ID of NFc
    Aud: NF Instance ID of NFp providing the service
    scope: indication of NF service(s) for which the token authorizes access
    exp: validity time indication of the token
    proxy: identifier of SCP or other proxy authorized to act for the NFc for the service
    proxy domain: identifier of SCP domain, a configured group of one or more SCP(s) and zero or more NF instances(s).

The token may comprise e.g. NF instance identifiers of the NFc, NRF, SCP and/or NFp, a validity identifier, scope of the specific service which is authorised for the NFc with the token. In particular, the access token may indicate the proxy, such as SCP, authorized to act on behalf of the NFc for requesting the service which is authorized by this access token. The indication of proxy may be invalid for proving authorization to act on behalf of the NFc for requests that relate to services not authorized by this access token. The proxy domain may identify a domain of authorized proxies or a group of authorized proxies. In some embodiments both proxy and proxy domain field are present in the access token, while in other embodiments, only one of the proxy and proxy domain fields is present. For example, the access token may comprise the proxy field without the proxy domain field. For example, the access token may comprise all the fields listed above, except the proxy domain field.

The access token may be cryptographically signed using a private key of the NRF. The afore-mentioned parameters, comprised in the access token, may be in scope of the signature, meaning the integrity of these parameters may be verified by verifying the signature. A validity of such a cryptographic signature may be verified using the corresponding public key of the NRF, which the NFp may obtain in connection with registering with the NRF the service(s) it offers, for example. When the NFc or SCP contacts the NFp, it may present the access token, which the NFp may then verify, for example at least in part by using its copy of the public key of the NRF. A message authentication code, MAC, based cryptographic signature may be used in some embodiments instead of, or in addition to, a public-key-cryptography based signature. Issuing an access token via a service communication proxy may comprise the proxy using the access token on behalf of the NFc with or without forwarding it to the NFc. In some cases, an NFc may use indirect routing via a proxy entity when requesting the access token from the NRF, and then use direct routing without proxy entities when requesting the service from the NFp, using the access token.

When requesting a service from an NFp, an NFc or an SCP acting on behalf of the NFc may include in a service request the access token authorizing access to the service, and a credential data element, such as client credentials assertion, CCA, of the NFc and/or the SCP. A CCA may comprise, for example, one, more than one or all of the following fields:

Credential Data Element (NFc)
    sub: NFc Instance id
    iat: Issue Time
    exp: Expiry time
    aud: NFp, NRF
    request: request or operation id for which CCA is generated
    service: service of the NF producer for which CCA is generated Here sub is an NF instance identifier of the NFc which generates this CCA. Here iat is a timestamp declaring the time of issue of the CCA, and exp an expiry time of the CCA. Here aud is a list of NF types expected to process the CCA, in this example the CCA is aimed at use in NFp and NRF entities. The request field, storing a request identifier, may be used to associate the credential data element, such as CCA, with a specific request. The request identifier may comprise a request serial number or a hash value obtained of a request or operation, for example. The request or operation identifier may be defined by the NFc or NFp. This provides the beneficial effect, that the credential data element cannot be re-used, for example by a malicious SCP, to request other services in the name of the NFc. The service field may identify a specific service with a service identifier, or a specific service type with a service type identifier. For example, the service type may be services internal to a core network of a communication system, or services that exclude banking services. The service field provides the beneficial effect, that re-use of the credential data element for the same service is enabled, while allowing the same credential to nonetheless be re-used in limited circumstances. Re-use provides the advantage that a new credential data element need not be issued for each request issued within the limited validity period of the CCA, and the SCP may proxy the credential data element.

Use of access tokens with proxy fields and credential data elements comprising request or service limitations, as described above, controls against an attack where a legitimate service request is tampered with before it reaches the NFp, to request a spurious service in the name of a legitimate NFc. Thus, a technical effect is achieved in more secure provision of service, which may be a service involving private information of network subscribers, for example. Further, a maliciously performing node may be detected as an originator of a spurious request.

Figure 2:
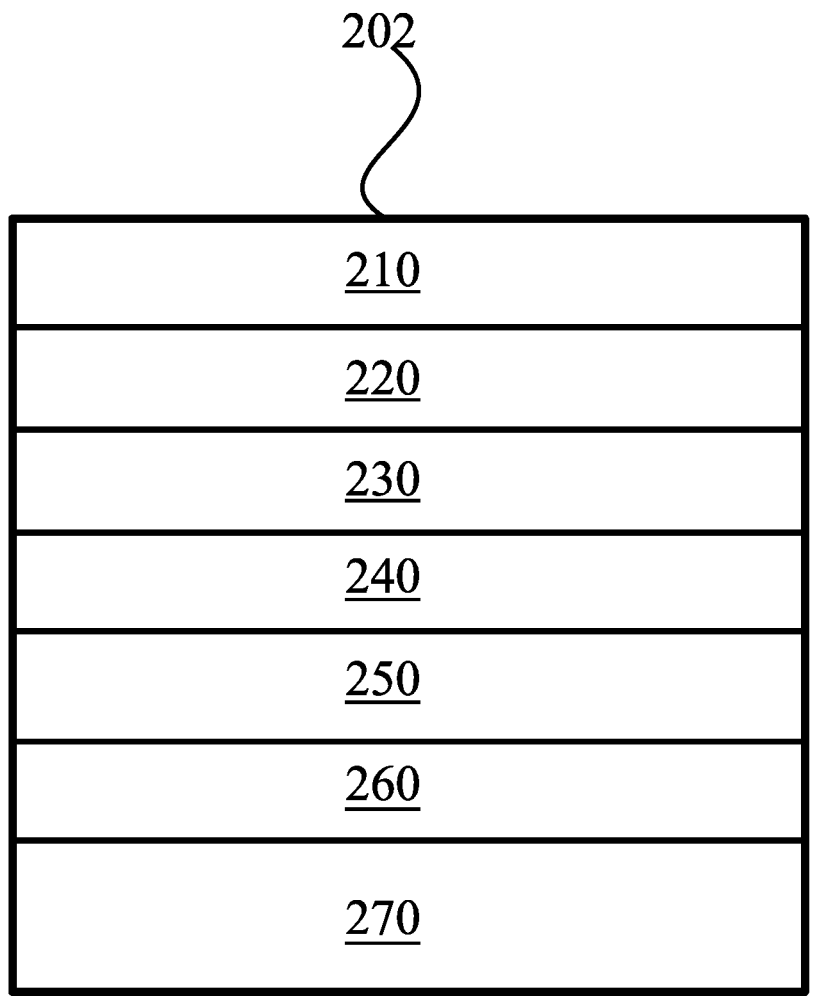
FIG. 2 illustrates an example credential data element in accordance with at least some embodiments of the present invention.

FIG. 2 illustrates an example credential data element in accordance with at least some embodiments of the present invention. A credential data element, such as, for example, a CCA or a transport layer security, TLS, certificate, 202, of FIG. 2 comprises the following fields. Field 210 comprises an identifier of the NFc whose credential data element this is, in other words, field 210 comprises an identifier of the NFc, such as an instance identifier or node identifier in case the system is a communication system. Field 220 comprises an issue time, indicating a moment in time when the NFc has constructed the credential data element. Field 230 comprises an expiry time, indicating a latest point in time when credential data element 202 may be accepted. The expiry time may be expressed as universal standard time, Unix time or other time standard which is used by multiple nodes. After this time, messages carrying this credential data element should be refused, since the NFc should not try to use an expired credential data element and attempts to use an expired credential data element are warning signs of attempts to abuse the system. The NFc can always generate a new credential data element and is not constrained to use an expired one. In some embodiments, instead of the expiry time, the credential data element comprises a validity time period, enabling other nodes to determine the expiry time from the issue time and the validity time period.

Field 240 comprises an identifier of a specific request the credential data element 202 is issued with, or for. Field 240 may be named a serviceRequestInfo field, for example. Field 240 may comprise a request serial number or a hash value obtained of a request, for example. Field 250 comprises a service type or service identifier, limiting the use of credential data element 202 to requests for the specific service identified by the identifier, or to services of the type identified by the service type. In various embodiments, field 240 or field 250 may be absent, that is, credential data element 202 may comprise one or both of fields 240 and 250. Field 260 stores an intended audience for the credential data element. This field may define, for example, that the credential data element is intended for NRF and/or NFp entities.

Finally, field 270 comprises a cryptographic signature obtained over fields 210, 220, 230, 240, 250 and 260 and, optionally, other parameters, if present in the credential data element. In other words, fields 210, 220, 230, 240, 250 and 260 are provided to a cryptographic signature algorithm as input, and the signature obtained as output is stored in field 270. The signature may be obtained using asymmetric encryption or MAC encryption, for example. The order in which the fields are present in the credential data element is not significant.

A NRF or NFp may validate the credential data element by verifying the signature from field 270, using a public key from a certificate of the NFc node which has issued credential data element 202. As part of validating the credential data element, the NFp and/or NRF may check that the request and/or service fields are consistent with the request that credential data element 202 is provided with. In case the request and/or service fields do not match the request that credential data element 202 is provided with, the NFp and/or NRF may be configured to discard the request without responding to it, or to respond with an error message indicating refusal of the request.

The SCP or other proxy entity cannot modify the credential data element, as it lacks the encryption key needed to update the signature in field 270 to account, for example, for changing the request field 240.

In general, credential data elements may be expected to be more short-lived than NRF-generated access tokens. So, they can be used in deployments with requirements for tokens with shorter lifetime for NF-NF communication. The credential data element may comprise a X.509 URL (x5u) to refer to a resource for the public key certificate or certificate chain used for signing the client authentication assertion, or a X.509 Certificate Chain (x5c) indicating the X.509 public certificate or certificate chain used for signing the credential data element.

Figure 3:
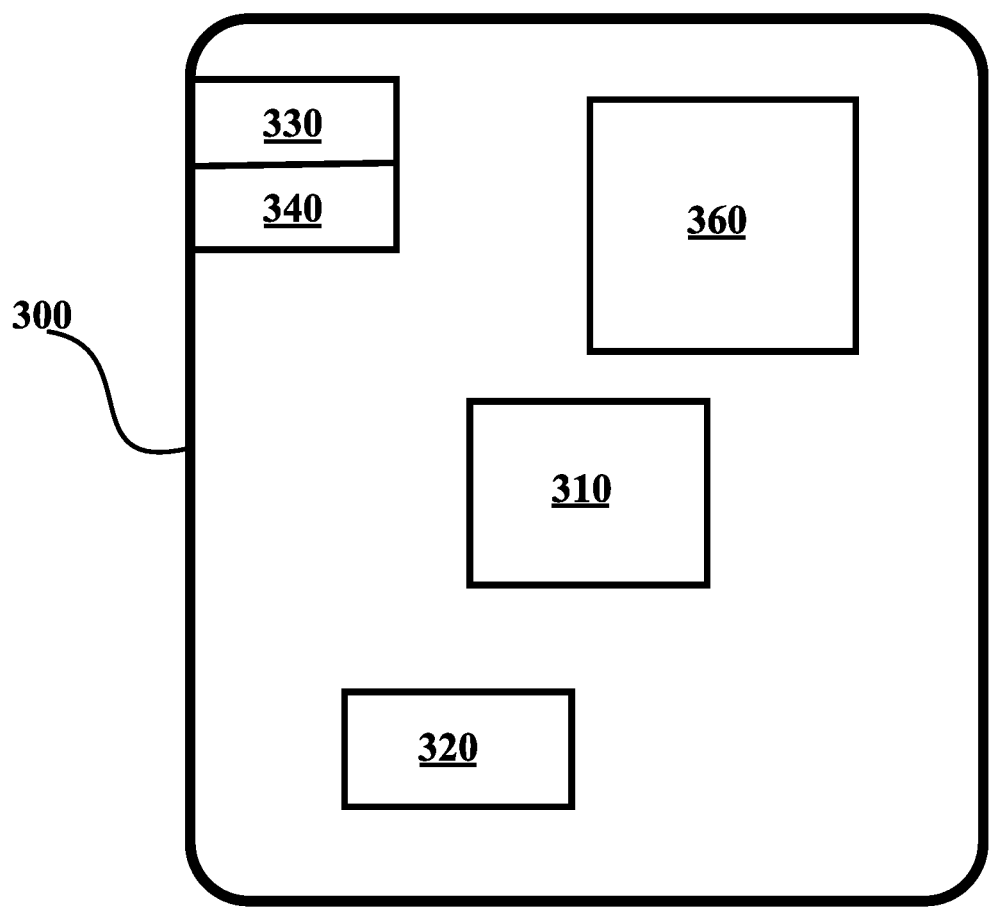
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device of FIG. 1, such as a device configured to perform as an NRF, an NFp or an NFc. Comprised in device 300 is processor 310, which may comprise, for example, a single- or multi-core processor wherein a single-core processor comprises one processing core and a multi-core processor comprises more than one processing core. Processor 310 may comprise, in general, a control device. Processor 310 may comprise more than one processor. Processor 310 may be a control device. A processing core may comprise, for example, a Cortex-A8 processing core manufactured by ARM Holdings or a Zen processing core designed by Advanced Micro Devices Corporation. Processor 310 may comprise at least one Qualcomm Snapdragon and/or Intel Xeon processor. Processor 310 may comprise at least one application-specific integrated circuit, ASIC. Processor 310 may comprise at least one field-programmable gate array, FPGA. Processor 310 may constitute means for performing method steps in device 300, such as functioning, transmitting, providing, receiving, signing, including, processing, refusing, rejecting and verifying. Processor 310 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analogue and/or digital circuitry, and (b) combinations of hardware circuits and software, such as, as applicable: (i) a combination of analogue and/or digital hardware circuit(s) with software/firmware and (ii) any portions of hardware processor(s) with software (including digital signal processor(s)), software, and memory(ies) that work together to cause an apparatus, such as a server node, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 300 may comprise memory 320. Memory 320 may comprise random-access memory and/or permanent memory. Memory 320 may comprise at least one RAM chip. Memory 320 may comprise solid-state, magnetic, optical and/or holographic memory, for example. Memory 320 may be at least in part accessible to processor 310. Memory 320 may be at least in part comprised in processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions. Memory 320 may be at least in part comprised in processor 310. Memory 320 may be at least in part external to device 300 but accessible to device 300.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to configure access parameters.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively, to a serial bus, the transmitter may comprise a parallel bus transmitter. Likewise, processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively, to a serial bus, the receiver may comprise a parallel bus receiver. Device 300 may comprise further devices not illustrated in FIG. 3.

Processor 310, memory 320, transmitter 330, receiver 340 and/or UI 360 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4A:
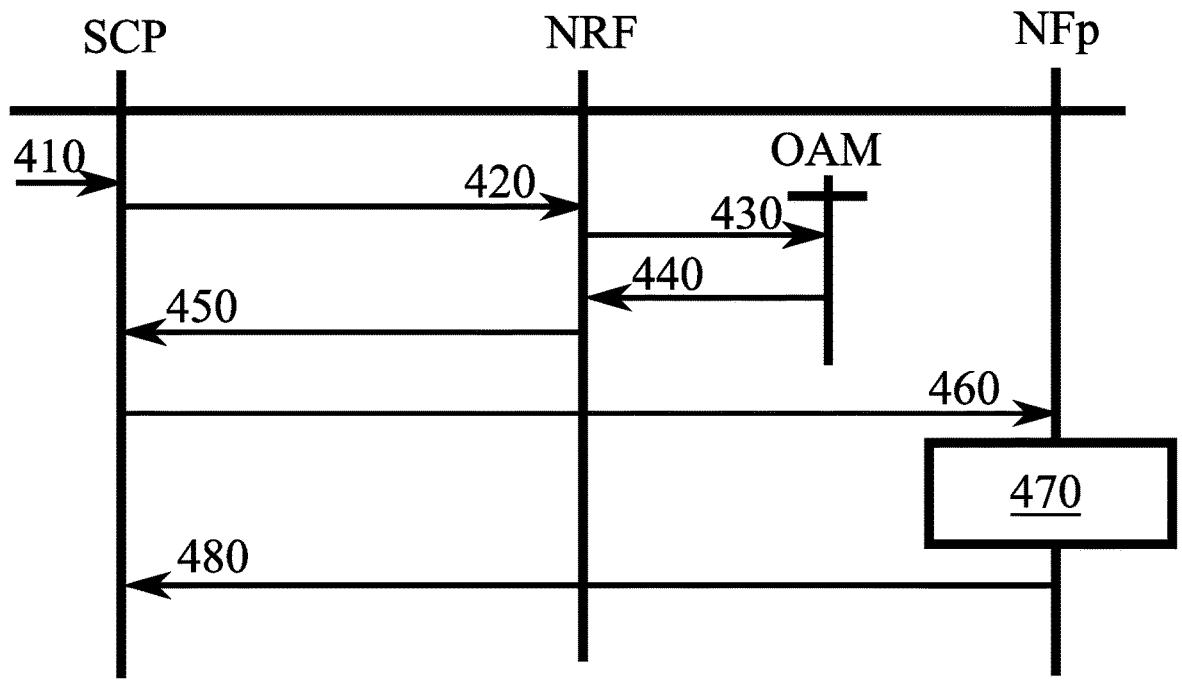
FIGS. 4A and 4B illustrate signalling in accordance with at least some embodiments of the present invention.

FIG. 4A illustrates signalling in accordance with at least some embodiments of the present invention. On the vertical axes are disposed, on the left, the SCP, in the centre, the NRF and on the right, the NFp. Time advances from the top toward the bottom.

In phase 410, the SCP receives a request for a service from the NFc, which is not illustrated in FIG. 4A for the sake of clarity. The request of phase 410 comprises the credential data element which, as described above, may contain an identifier of the request, or of the requested service, for example. FIG. 2 illustrates an example of such a credential data element. In phase 420, the SCP requests an access token from the NRF, the access token to authorize access for the NFc to the requested service. The request of phase 420 may likewise comprise the credential data element of the NFc, as well as a credential data element of the SCP. The request of phase 420 may comprise the request of phase 410, to allow checking a request field in the credential data element of the NFc.

Responsive to the request of phase 420, the NRF may query from another node, such as an OEM mode, for information on which SCP nodes are authorized to act on behalf of the NFc. For example, the NRF may request a list of such authorized SCP nodes, or it may query if the specific SCP which sent request 420 is so authorized. The NRF may dependably obtain an identity, or identifier, of the SCP from the credential data element of the SCP, for example. Likewise the NRF can obtain the identity of the NFc from the credential data element of the NFc, comprised in request 420. The other node, such as OAM, responds in phase 440. Once in possession of this response, the NRF may verify, whether the SCP which sent request 420 is authorized to act on behalf of the NFc. Further, the NRF may verify that the credential data element of the NFc may be used for the kind of service, or the specific service, or the specific request. In the case of the specific request, the presence of request 410 inside request 420 enables the verification. In case these checks indicate the credential data element of the NFc is being used correctly, and the SCP is authorized to request access tokens on behalf of the NFc, the NRF may issue the requested access token, which, as noted above, contains an indication of the SCP which sent request 420 as being authorized to act on behalf of the NFc. This indication may take the form of an instance identifier and/or FQDN of the SCP, for example. The issuing of the requested access token takes place as phase 450 in FIG. 4A. The NRF may obtain from the OAM information concerning the network function consumer, and use the information concerning the network function consumer to verify the request and/or the profile of the network function when acting as producer. Profiles in the NRF relate to NFp entities, or NFp roles, in other words, the profile of the NF in the NFp role may be verified when the NF issues a request as an NFc. For example, an access token request might include the slices supported by the NFc. and the NRF might still OAM to verify that this slice information is genuine.

In phase 460, the SCP may request the service from the NFp on behalf of the NFc. The request of phase 460 may comprise the credential data elements of the NFc and the SCP, and the access token issued in phase 450. The request of phase 460 may comprise the request of phase 410, to allow checking a request field in the credential data element of the NFc. In phase 470, the NFp may verify the access token by checking the cryptographic signature thereon, and that the access token indicates that the SCP, identified using the credential data element of the SCP, present in request 460, is authorized to request service on behalf of the NFc. In some embodiments, the NFp may obtain the identity of the SCP from a TLS certificate used in establishing a connection between the SCP and the NFp. In that case, the TLS certificate is the credential data element of the SCP. In some embodiments, the NFp also checks, that the credential data element of the NFc is consistent with the service identifier or service type of the service requested in phase 460. The NFp may also check, using a public certificate of the NFc, that the cryptographic signature on the credential data element of the NFc is correct. In case these checks indicate there are no reasons to deny the request, the NFp provides the service, phase 480, to the NFc either via the SCP, as illustrated, or directly.

If there are multiple SCPs between either NFc and NRF, or NFc and NFp, an SCP authorized to act on behalf of an NFc is the first SCP which is in direct communication with the NFc. For subsequent SCPs, the initial SCP may adds its information in the 'via or other custom header', for example. The NRF can verify if the first SCP is authorized either based on interaction with OAM, or based on a profile if the NFc registers a profile if it acts, or has acted, as an NFp. The NFp, can, likewise, verify if the first SCP information is present in the access token. The verification of phase 470 may be performed by a producer side service communication proxy in case there are more than one SCP along the routing path from the NFc to the NFp.

Figure 4B:
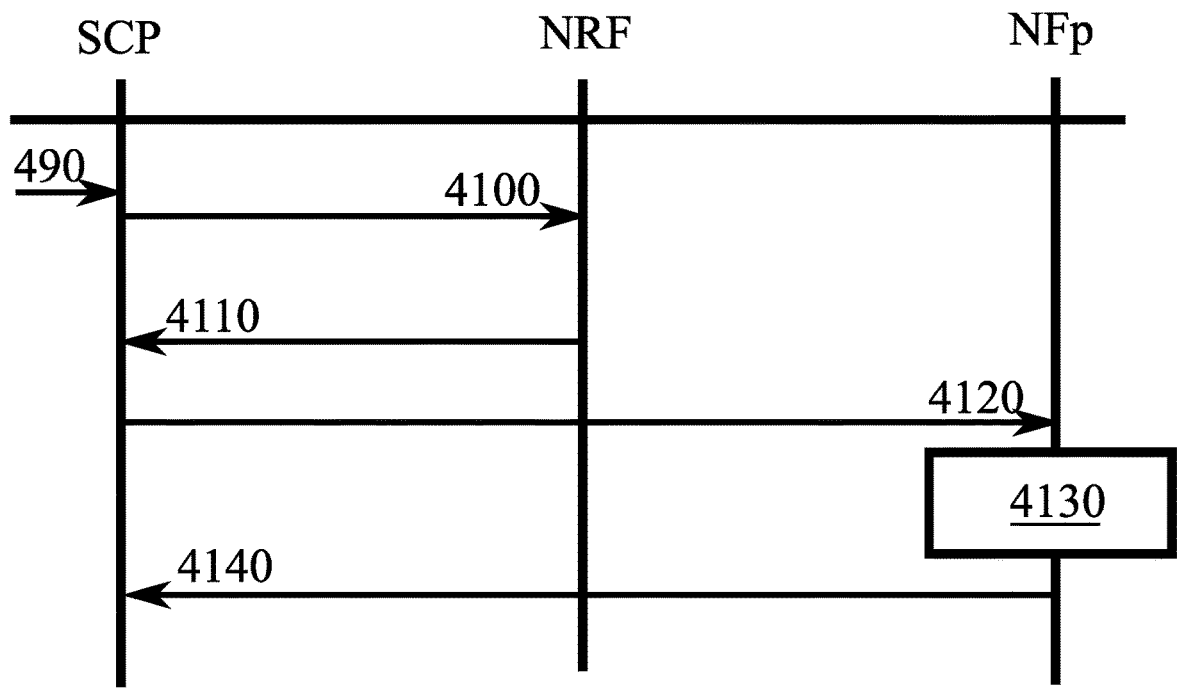

FIG. 4B illustrates signalling in accordance with at least some embodiments of the present invention. The process is similar to that in FIG. 4A. Phases 490 and 4100 correspond to phases 410 and 420 of FIG. 4A.

After phase 4100, the NRF determines whether the SCP which sent request 4100 is authorized to act on behalf of the NFc. It may determine this from a profile of the NFc it has access to, the profile being established by the NFc node, for example previously, for example previously when acting as an NFp to register a service it provides in the NRF. The NFc may thus have, in its profile, information on the SCP authorized and, optionally, also which application programming interfaces, APIs, of the SCP are authorized. Information in the profile may define one or more SCP nodes as authorized to request access tokens on behalf of the NFc. This authorization may be expressed in terms of SCP instance identifier, SCP FQDN and/or the SCP domain. Indicating the domain in the profile as authorized authorizes all SCPs in that domain. As was the case in FIG. 4A, the NRF may also check, that the credential data element of the NFc, in request 4100, is usable in relation with request 4100 in that the request identity, service identity or type of requested service is allowed by the credential data element. The NRF may obtain the identities of the NFc and the SCP from their respective credential data elements, comprised in request 4100.

If the SCP is authorized in the profile, the NRF issues the requested access token, phase 4110, the access token indicating the SCP as authorized to act on behalf of the NFc. In some embodiments, the NRF also checks that the credential data element of the NFc is usable for request 4100 before issuing the requested access token, and wherein the NRF refuses to issue the requested access token in case the credential data element is not usable for request 4100. As in the process of FIG. 4A, the indication is, in the access token, within the scope of a cryptographic signature of the NRF, such that the SCP cannot add itself to the access token as an authorized SCP.

Phases 4120 to 4140 correspond to phases 460 to 480 in FIG. 4A, respectively. The verification of phase 4130 may be performed by a producer side service communication proxy in case there are more than one SCP along the routing path from the NFc to the NFp. The producer side SCP is closer to the NFp, along the routing path, than the authorized SCP.

FIG. 5 is a flow graph of a method in accordance with at least some embodiments of the present invention. The phases of the illustrated method may be performed in the NRF, or in a control device configured to control the functioning thereof, when installed therein.

Phase 510 comprises processing, in an apparatus, a request for an access token authorizing access for a network function consumer to a service provided by a network function producer, the request being received in the apparatus from a service communication proxy, wherein the processing comprises one or more of the following verification:

Phase 520: verification that a credential data element comprised in the request, cryptographically signed by the network function consumer, identifies the request, the service or a type of the service, and Phase 525: verification with reference to a further node, or to a profile of the network function consumer, that the service communication proxy is authorized to act on behalf of the network function consumer.

Phase 530 comprises transmitting, responsive to at least one of the verifications being successful, the requested access token, the access token comprising an indication of the service communication proxy.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in network operation.

ACRONYMS LIST

CCA client credentials assertion
FQDN fully qualified domain name
UDM unified data management

The invention claimed is:

1. An apparatus comprising at least one processor, at least one memory storing instructions that, when executed by the at least one processor, cause the apparatus at least to:
   process a request for an access token authorizing access for a network function consumer to a service provided by a network function producer, the request being received in the apparatus from a service communication proxy, wherein the processing comprises one or more of the following:
      verification that a credential data element comprised in the request, cryptographically signed by the network function consumer, identifies the request, the service or a type of the service, or
      verification with reference to a further node, or to a profile of the network function consumer, that the service communication proxy is authorized to act on behalf of the network function consumer;
   transmit, responsive to at least one of the verifications being successful, the requested access token, the access token comprising an indication of the service communication proxy; and
   perform as a network repository function and cryptographically sign the access token using a private key of the network repository function.

2. The apparatus according to claim 1, wherein the apparatus is configured to perform the verification with reference to the further node, wherein the further node comprises an operations, administration and maintenance node or a subscriber information database.

3. The apparatus according to claim 2, wherein the apparatus is configured to request from the operations, administration and maintenance node information concerning the network function consumer, and to use the information concerning the network function consumer to verify the request and/or the profile of the network function when acting as producer.

4. The apparatus according to claim 1, wherein the apparatus is configured to perform the verification with reference to the profile of the network function consumer, wherein the apparatus has established the profile of the network function consumer prior to processing the request, when the network function consumer acts in a role of a second network function producer.

5. An apparatus comprising at least one processor, at least one memory storing instructions that, when executed by the at least one processor, cause the apparatus at least to:
   process a request for access for a network function consumer to a service provided by a network function producer, the request being received in the apparatus from a service communication proxy, wherein the processing comprises the following:
      first verification that a credential data element comprised in the request, cryptographically signed by the network function consumer, identifies the request, the service or a type of the service, and
      second verification that an access token comprised in the request indicates that the service communication proxy is authorized to act on behalf of the network function consumer, wherein the second verification is performed by comparing the indication in the access token with information in a credential data element comprised in the request, and wherein the request is cryptographically signed by the service communication proxy; and
   provide, responsive to the first and second verifications being successful, the network function consumer with access to the service.

6. The apparatus according to claim 5, wherein the apparatus is configured to establish a profile of itself in a network repository function, the profile identifying at least one service communication proxy as authorised to act on behalf of the apparatus when the apparatus acts in a role of a second network function consumer.

7. The apparatus according to claim 5, wherein the apparatus is configured to refuse to provide the service, or abstain from providing the service, responsive to a determination that none of the first and second verifications comprised in the processing is successful.

8. The apparatus according to claim 5, wherein the apparatus is configured to perform as the network function producer or as a producer side service communication proxy.

* * * * *